Patented June 17, 1941

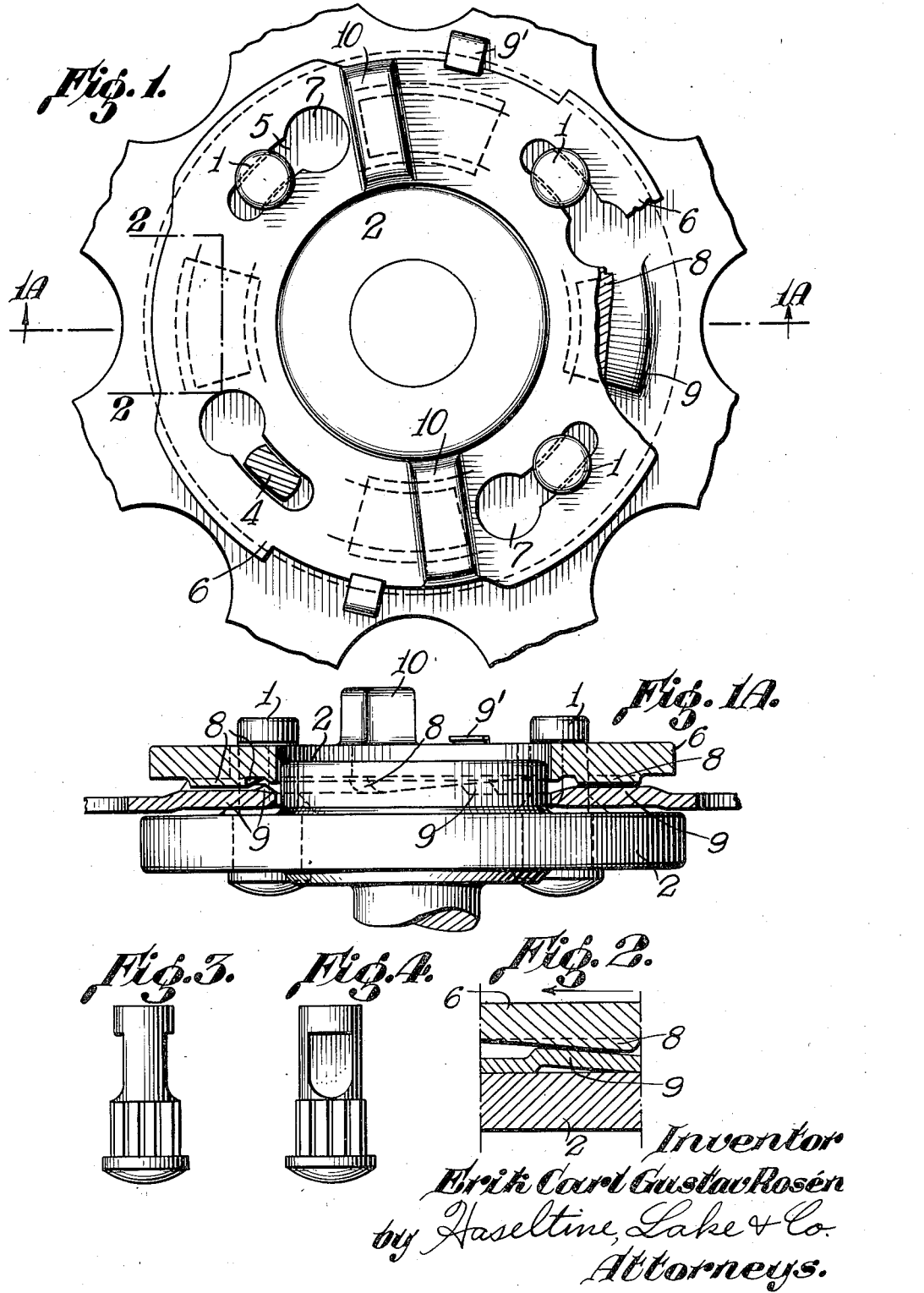

2,246,009

UNITED STATES PATENT OFFICE 2,246,009

WHEEL MOUNTING

Erik Carl Gustaf Rosén, Lidingo, Sweden

Application October 18, 1938, Serial No. 235,545
In Sweden October 9, 1937

3 Claims. (Cl. 301—9)

The invention herein considered consists of an arrangement for the attachment of wheels to vehicles, particularly motor vehicles, which arrangement comprises a hub flange with fixed bolts which are adapted to engage corresponding holes in the vehicle wheel in a view to the attachment of the same. The term hub flange as used herein is intended to refer to axle flange or bearing flange, since according to the invention it is quite unimportant in what manner the wheel is mounted for permitting the rotary motion thereof.

It is previously known to secure the wheel to the hub flange by the aid of nuts and threaded hub bolts, generally four to eight bolts having been employed for this purpose. Under favourable conditions, e. g. in the garage or the work shop, it does not, upon the change or the attachment of a wheel, involve any essential difficulty to manipulate nuts and monkey wrenches or similar tools necessary for fitting up the wheel. On the other hand, if a change of a wheel is to be made on the roadway in unfavourable weather and perhaps in the dark, or on the racing track in as short a time as possible, a screw connection involves considerable inconveniences, partly due to the fact that the nuts have to be fitted into the threads of the bolts with a certain cautiousness, which may sometimes be rather time-consuming, partly due to the fact that screw-threaded surfaces are, under said conditions, difficult to keep free from coatings and adhering particles. Beyond this, it should be pointed out that a thread may extremely easily be damaged so that the bolt, the nut, or both, must be replaced or the threads thereof be improved. According to the invention, said inconveniences are avoided principally on account of the fact that the free ends of the hub bolts are provided with heads and that the wheel, preferably its central portion, is clamped between said bolt heads and the hub flange by the aid of sliding or displaceable wedge members. In addition, it has been found to be particularly expedient to arrange the wedge members displaceable in the peripheral direction of the wheel.

The invention will be more closely described in the following with reference to the accompanying drawing, which illustrates an embodiment suitable in the practical case.

Figure 1 shows an arrangement according to the invention, as viewed from the outside of the vehicle.

Fig. 1A is a transverse section of the invention as taken on line A—A in Fig. 1.

Figure 2 shows a partial section taken on line 2—2 of Fig. 1.

Figures 3 and 4 show a hub bolt according to the invention, as viewed in two mutually perpendicular directions at right angles to each other.

The hub bolts, according to the shown example four in number, are designated with 1. These bolts are inserted in a hub flange 2 which may be rigidly secured either to a rotatable shaft or to a bearing which in turn is rotatively mounted on an axle spindle. The hub flange 2 is designed in previously known manner, and the bolts 1 are fastened in the same in the established manner. According to Figures 3 and 4 the base portion 3 of the bolts, said portion being fastened in the hub flange, is provided with a convex head and formed with grooves, ribs or the like in a view to retaining the bolt in the hub flange in such a manner that it cannot be turned. It is evident that the base portion 3 of the hub bolt may also may be edged, e. g. may have a square section. Below the head the supporting portion 4 of the bolt is bevelled on two opposite sides so that the bolt body will have a smaller dimension in the radial direction of the wheel than in the peripheral direction. The bolt head and the portion 4 are preferably formed, in a first step, either circular section with one and the same diameter, whereupon said bevelling is effected. By this means, two opposite portions of the bolt head will extend, in the radial direction of the wheel, beyond the bevelled sides of the portion 4 and form abutments for taking up the pressure upon the clamping of the wheel between the bolt heads and the hub flange. The central portion of the wheel (usually the so-called wheel disc) is provided with bolt holes in known manner and is adapted to be placed into contact with the hub flange at the mounting and, according to the invention, to be clamped by the aid of wedge shaped members. These latter are adapted to be brought into active position by means of an annular member 6 provided with four slots 5 which at one end merge into a circular bolt hole 7. Said bolt hole is so proportioned that the bolt head 1 may easily be passed through the hole at the mounting of the wheel. According to the shown example it is assumed that the wheel has a wheel disc which in previously known manner is provided with folds, stiffening ribs or the like, for the purpose of obtaining the requisite strength. Upon the mounting of the wheel, this latter is placed on the bolts 1 and is pushed against the hub flange. The annular member 6 is placed outside the wheel disc, the bolts being introduced through the holes 7, whereupon the ring 6 is turned in the direction of the arrow so that the bolts engage the slots 5 and the wedge members come into action. According to the shown embodiment, the wedge members necessary for clamping the wheel between the bolt heads 1 and the hub flange 2 are arranged partly on the ring 6, partly on the disc plate which members are designated with 8 and 9, respectively.

It is to be noted that the wedge shaped members are disposed in the space between the bolts, and the ring may be made somewhat yieldable so that an elastic clamping is ensured. The wedge shaped members 8 of the ring are constructed as beads which, in the turning direction of the ring, indicated by the arrow, have an increasing thickness. The wedge shaped members 9, which are formed for example in the wheel disc by means of pressing, have, however, their highest portion in the opposite direction relative to the wedge members 8 and are proportioned in such a manner that, when the ring 6 is turned in the direction of the arrow, the highest portions of each group of wedge members approach one another and the ring is forced outwardly in axial direction into engagement with the bolt heads 1. By this means, the wheel disc is clamped between the ring 6 and the hub flange 2. In order to facilitate the turning of the ring 6 upon mounting and dismounting the wheel, the ring is preferably provided with shoulders 10, in the shown example two in number, which are so designed as to constitute a suitable abutment for a chisel or the like, by means of which the ring, with the use of an impact tool, may be turned into and out of locking engagement with the bolts 1. In order to further simplify both the mounting and the removal of the wheel the annular member 6 may be arranged angularly adjustable on the wheel disc and, at the same time, be retained by lugs 9' or similar members in such a manner that it will not be detachable from the wheel, but certainly be adjustable in the necessary path of motion. Thus, each wheel is provided with an appertaining locking ring, the wedge members of which always cooperate with the same wedge member on the wheel disc. Such an arrangement provides that the locking ring upon the mounting of the wheel will be in position for a preliminary, rapid clamping, and also has the advantage that the locking ring forms a shelter for the wedge shaped members during the transport and handling of the wheel.

In order to protect the bolts, upon the displacement of the wedge members, against bending stresses in the radial direction of the wheel, there is preferably arranged a guidance for the ring 6 in such a manner that the inner or outer edge of the ring slips upon a bearing surface concentric with the wheel. Said bearing surface may be formed either on the wheel disc or on the hub flange.

I claim:

1. Means for the attachment of a wheel to a vehicle including a hub flange, headed bolts permanently carried by the hub flange, a wheel having a circular series of openings therein between the wheel axis and periphery and through which said bolts project, an annularly movable ring provided with key-hole slots cooperating with the bolt heads outwardly of the wheel and a circular series of distinct cooperating wedge members respectively disposed between the hub bolts carried by the ring and the wheel, respectively and rendered active upon turning movements of said ring for moving the central portion of the wheel into binding engagement with the hub flange.

2. Means for the attachment of a wheel to a vehicle including a hub flange, headed bolts permanently carried by the hub flange, a wheel member having a circular series of openings therein between the axis of said wheel member and periphery and through which said bolts project, an annularly movable ring member provided with key-hole slots cooperating with the bolt heads outwardly of the wheel member and a circular series of equidistantly spaced cooperating wedge members respectively disposed between the hub bolts carried by at least one of said members and rendered active upon turning movement of said ring member for moving the central portion of the wheel member into binding engagement with the hub flange and said ring member being elastically yieldable in a direction transversely to the plane of the hub flange.

3. Means for attaching a wheel to a vehicle as set forth in claim 1, characterized by the ring being elastically yieldable in a direction transversely to the plane of the hub flange.

ERIK CARL GUSTAF ROSÉN.